(12) United States Patent
Adkisson et al.

(10) Patent No.: US 7,331,003 B2
(45) Date of Patent: *Feb. 12, 2008

(54) MATCH CIRCUIT FOR PERFORMANCE COUNTER

(75) Inventors: Richard W. Adkisson, Dallas, TX (US); Tyler Johnson, Plano, TX (US)

(73) Assignee: Hewlett-Packard Development Company, L.P.

( * ) Notice: Subject to any disclaimer, the term of this patent is extended or adjusted under 35 U.S.C. 154(b) by 912 days.

This patent is subject to a terminal disclaimer.

(21) Appl. No.: 10/635,373

(22) Filed: Aug. 6, 2003

(65) Prior Publication Data

US 2004/0236996 A1 Nov. 25, 2004

Related U.S. Application Data

(60) Provisional application No. 60/469,180, filed on May 9, 2003.

(51) Int. Cl.
*G06F 11/00* (2006.01)
*G01R 31/28* (2006.01)

(52) U.S. Cl. .................. 714/706; 714/724

(58) Field of Classification Search .................. None
See application file for complete search history.

(56) References Cited

U.S. PATENT DOCUMENTS 5,651,112 A 7/1997 Matsuno et al.

| | | | |
|---|---|---|---|
| 5,796,633 A | 8/1998 | Burgess et al. | |
| 5,835,702 A | 11/1998 | Levine et al. | |
| 5,881,223 A | 3/1999 | Agrawal et al. | |
| 5,881,224 A * | 3/1999 | Ranson et al. ................ | 714/47 |
| 6,112,317 A | 8/2000 | Berc et al. | |
| 6,112,318 A | 8/2000 | Jouppi et al. | |
| 6,360,337 B1 | 3/2002 | Zak et al. | |
| 6,539,502 B1 | 3/2003 | Davidson et al. | |
| 6,546,359 B1 | 4/2003 | Week | |
| 2002/0184477 A1 | 12/2002 | Swaine et al. | |

FOREIGN PATENT DOCUMENTS

JP 03216727 A * 9/1991

OTHER PUBLICATIONS

High-Speed and Low Swing On-Chip Bus Interface Using Threshold Voltage Swing Driver and Dual Sense Amplifier by Yang et al. Solid-State Circuits Conference, 2000. ESSCIRC '00. Proceedings of the 26th European □□Sep. 19-21, 2000 pp. 105-108.*
"Informe Sobre El Estado De La Tecnica"; Apr. 1, 2005; 1 page.

* cited by examiner

*Primary Examiner*—Cynthia Britt

(57) ABSTRACT

In one embodiment, the invention is directed to a match circuit for implementation in a general purpose performance counter ("GPPC") connected to a bus carrying debug data. The match circuit comprises logic for activating a match signal when a selected N-bit portion of the debug data matches an N-bit threshold for all bits selected by an N-bit match mask ("mmask").

25 Claims, 3 Drawing Sheets

MATCH CIRCUIT FOR PERFORMANCE COUNTER

PRIORITY UNDER 35 U.S.C. §119(e) & 37 C.F.R. §1.78

This nonprovisional application claims priority based upon the following prior United States provisional patent application entitled: "*General Purpose Counters for Performance, Debug and Coverage*," Application No.: 60/469,180, filed May 9, 2003, in the name(s) of Richard W. Adkisson and Tyler J. Johnson, which is hereby incorporated by reference.

CROSS-REFERENCE TO RELATED APPLICATIONS

This application is related to U.S. patent application Ser. No. 10/635,371, filed Aug. 6, 2003 entitled COVERAGE CIRCUIT FOR PERFORMANCE COUNTER (U.S. Publication 2004/0237004); U.S. Pat. No. 7,275,191 entitled COVERAGE DECODER CIRCUIT FOR PERFORMANCE COUNTER; U.S. patent application Ser. No. 10/635,103, filed Aug. 6, 2003 entitled DATA SELECTION CIRCUIT FOR PERFORMANCE COUNTER (U.S. Publication 2004/0236994); U.S. patent application Ser. No. 10/635,079, filed Aug. 6, 2003 entitled ZEROING CIRCUIT FOR PERFORMANCE COUNTER (U.S. Publication 2004/0236992); U.S. patent application Ser. No. 10/635,083, filed Aug. 6, 2003 entitled GENERAL PURPOSE PERFORMANCE COUNTER (U.S. Publication 2004/0236993); and U.S. patent application Ser. No. 10/635,369, filed Aug. 6, 2003 entitled INCREMENT/DECREMENT CIRCUIT FOR PERFORMANCE COUNTER (U.S. Publication 2004/0237003), all of which are hereby incorporated by reference in their entirety.

Related subject matter disclosed in the following commonly owned co-pending U.S. Patents (i) U.S. Pat. No. 7,146,538, A BUS INTERFACE MODULE, and (ii) U.S. Pat. No. 7,188,277 AN INTEGRATED CIRCUIT, is hereby incorporated by reference.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. These applications are not supported by the state-of-the-art performance counters.

SUMMARY

In one embodiment, the invention is directed to a match circuit for implementation in a general purpose performance counter ("GPPC") connected to a bus carrying debug data. The match circuit comprises logic for activating a match signal when a selected N-bit portion of the debug data matches an N-bit threshold for all bits selected by an N-bit match mask ("mmask").

DETAILED DESCRIPTION OF THE DRAWINGS

Figure 1:
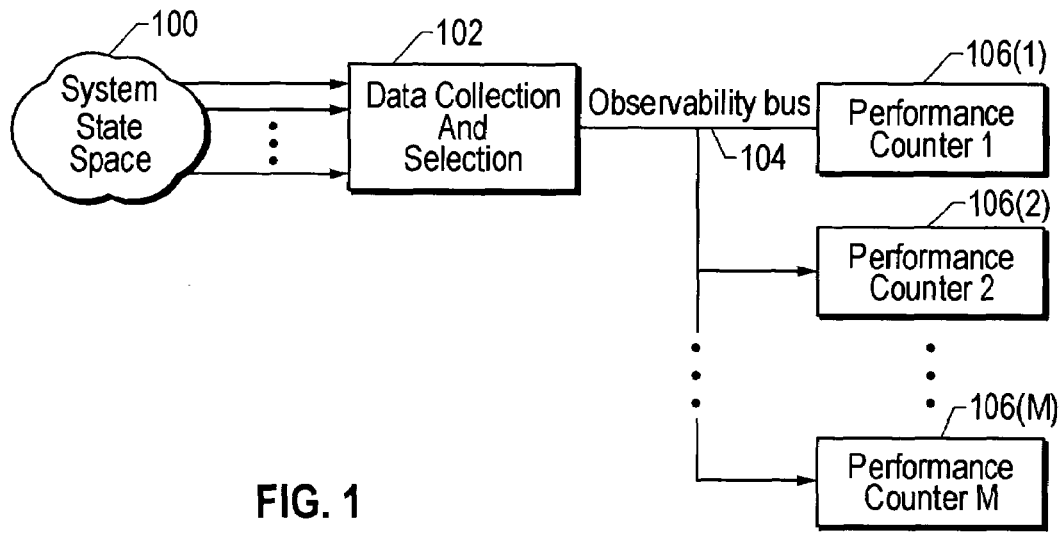
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_bus signal to a plurality of performance counters 106(1)-106(M). Details of one embodiment of the logic 102 and bus 104 are provided in U.S. patent application Ser. No. 10/402,092, filed Mar. 28, 2003, entitled A BUS INTERFACE MODULE; and U.S. patent application Ser. No. 10/402,034, filed Mar. 28, 2003, entitled AN INTEGRATED CIRCUIT, each of which is hereby incorporated by reference in its entirety.

In one embodiment, D is equal to 80, M is equal to 12, and performance counters 106(1)-106(M-1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
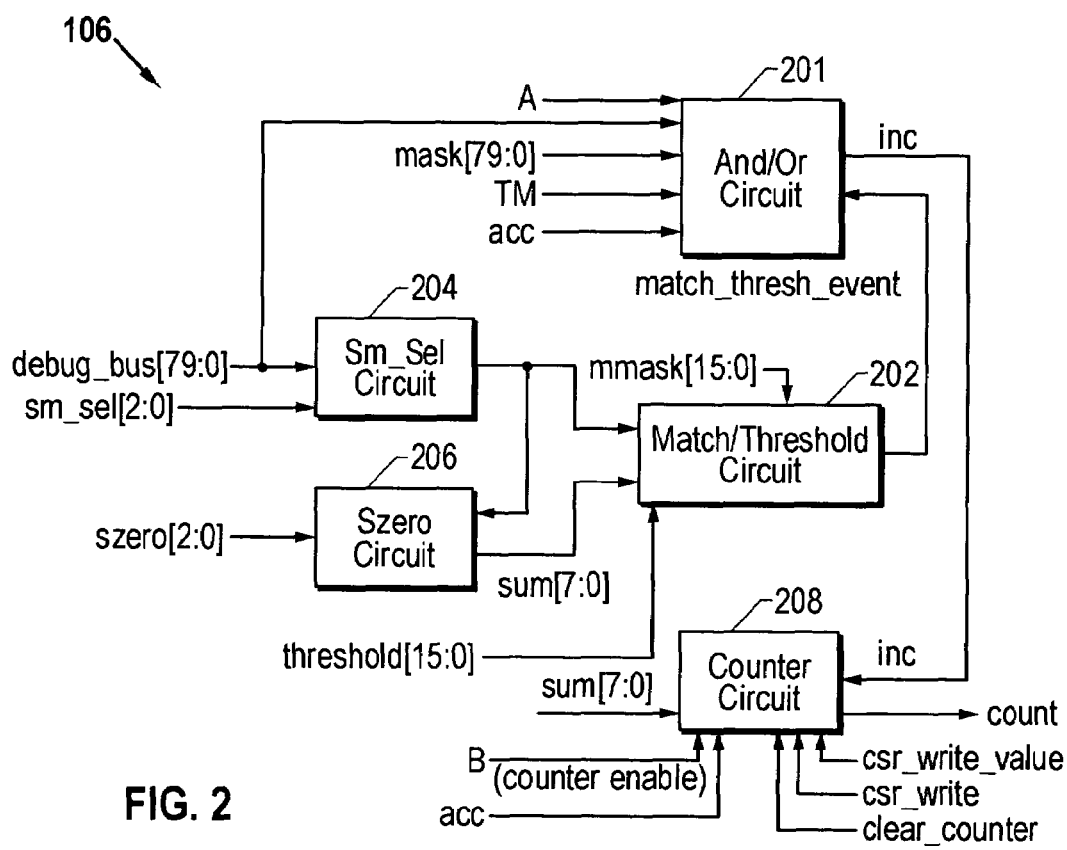
FIG. 2 is a block diagram of a general purpose performance counter according to one embodiment.

FIG. 2 is a block diagram of a general purpose performance counter 200, which is identical in all respects to each of the performance counters 106(1)-106(M-1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
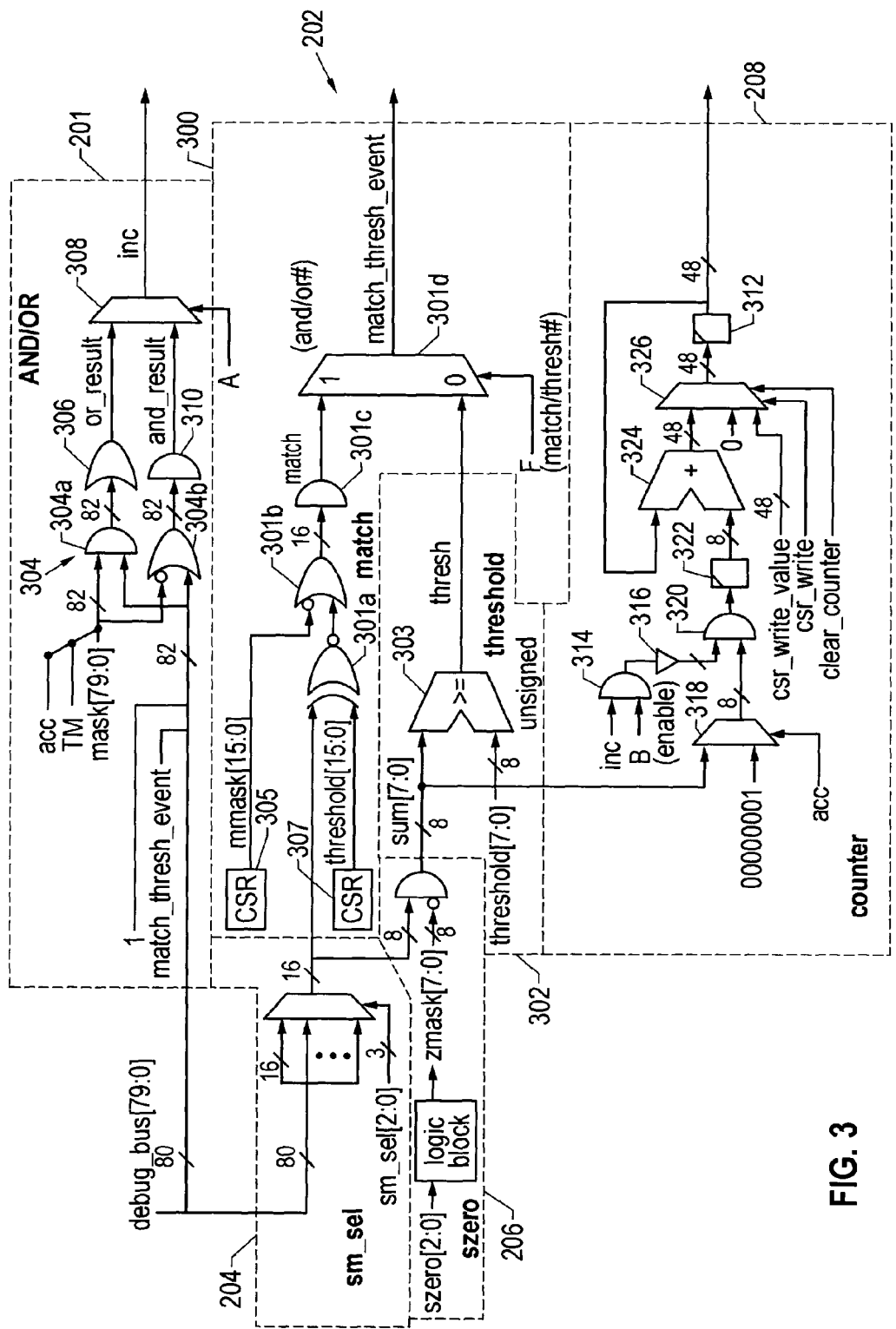
FIG. 3 is a more detailed block diagram of the general purpose performance counter of FIG. 2 wherein an embodiment of a match/threshold circuit is illustrated.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold for all bits selected by an N-bit match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh_event signal is one of the two bits appended to the debug_bus signal. In the illustrated embodiment, N is equal to 16.

In general, when the match/threshold circuit 202 is operating in match mode, the match portion 300 detects in the debug_bus signal any arbitrary binary pattern of up to N bits aligned on 10-bit block boundaries. This includes matching a one, zero or "don't care" ("X") on any bit. This allows detection of specific packets or specific groups of packets or states.

In one embodiment, the match portion 300 comprises an exclusive NOR ("XNOR") circuit, represented in FIG. 3 by a single XNOR gate 301a, for bit-wise exclusive-NORing ("XNORing") a selected N-bit portion of the debug_bus signal output from the sm_sel circuit 204, as described in detail below, with an N-bit threshold which may be output from a control status register ("CSR") 307, for example. An N-bit signal output (i.e., a first intermediary output) from the XNOR circuit (represented by the XNOR gate 301a, although there may be as many as N such gates) is input to an OR circuit, represented in FIG. 3 by a single OR gate 301b, where it is bit-wise ORed with the inverse of the N-bit mmask, which may be provided by a CSR 305 in one embodiment. The N-bit output (i.e., a second intermediary output) of the OR circuit represented by the OR gate 301b (each of the N output bits being generated by a signal 2-input OR gate) are input to an N-bit AND gate 301c. The output of the AND gate 301c is input to one input of a two-input MUX 301d as a "match" signal. When the match/threshold circuit 202 is operating in match mode (as controlled by a selection control signal, e.g., the match/thresh# control signal), the match signal is output from the MUX 301d as the match_thresh_event signal to the AND/OR circuit, as described above.

As a result of the operation of the match portion 300, no extra random logic is required for decoding packets or states into "one-hot" signals, which are 1-bit signals that transition to a logic "1" for each value of the state. The match/threshold circuit 202 requires an N-bit pattern field and an N-bit mask field. To reduce the number of control bits required, in the embodiment illustrated in FIG. 3, the N bit pattern field is the same field used for a threshold portion 302 of the circuit 202, as described below, as it is unlikely that both the match portion 300 and the threshold portion 302 will be used at the same time, especially if the sm_sel circuit 204 supplies the same N bits to both.

When the match/threshold circuit 202 is operating in "threshold" mode, the threshold portion 302 of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

A compare circuit 303 of the threshold portion 302 compares a sum[7:0] signal output from the szero circuit 206, described below, with the least significant S bits of the N-bit threshold signal and outputs a logic one if the former is greater than or equal to the latter and a zero if it is not. The output of the compare circuit 303 is input to a second input of the MUX 301d as a thresh signal. When the match/threshold circuit 202 is operating in threshold mode, the thresh signal is output from the MUX 301d as the match_thresh_event signal to the AND/OR circuit, as described above.

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. The szero circuit 206 zeroes out none or all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the szero circuit 206 are provided in U.S. patent application Ser. No. 10/635,103, filed Aug. 6, 2003 entitled DATA SELECTION CIRCUIT FOR PERFORMANCE COUNTER and U.S. patent application Ser. No. 10/635,079, filed Aug. 6, 2003 entitled ZEROING CIRCUIT FOR PERFORMANCE COUNTER.

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation.

Figure 4:
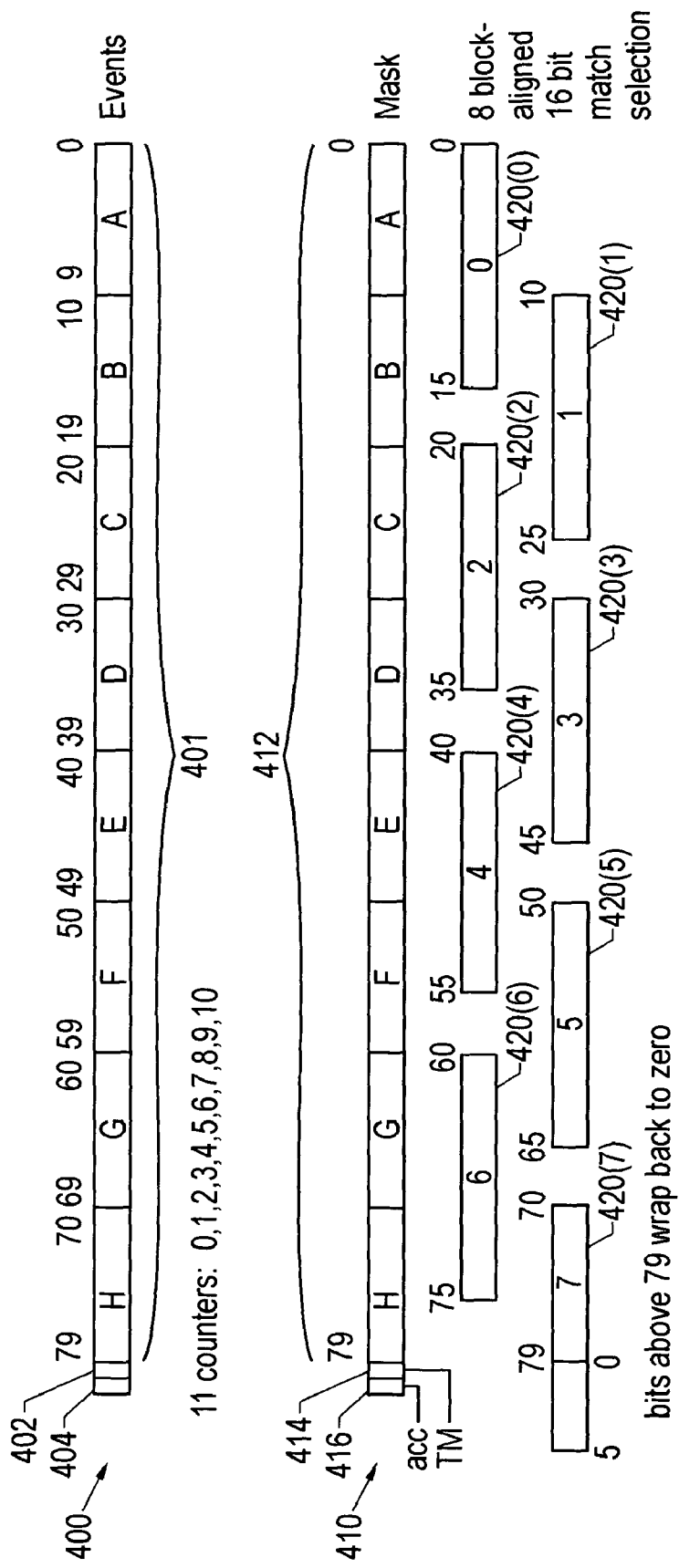
FIG. 4 illustrates a method in which signals are mapped from an observabilty bus to a performance counter in accordance with one embodiment.

Those 16 bits are aligned to 10 slot boundaries as shown in an exemplary mapping arrangement illustrated in FIG. 4.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") which may originate from a CSR (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting a counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8× replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters represented by the performance counter 200, making them general purpose. All D bits of the debug_bus signal can be used by the AND/OR circuit 201.

N bits aligned on block boundaries can be selected by the sm_sel circuit 206, enabling full coverage of the observabilty bus 104.

Previous performance counters could only match ones or use thresholding. The embodiment described herein, using the match portion 300 of the match/threshold circuit 202, can match ones, zeros, and "don't care" bits. It can also match groups of packets and states. For example, it can match all packets with a "10x01" pattern in bit positions 6 through 2 regardless of the values of the other bits or bit 4. It eliminates the need for the logic being analyzed (i.e., debugged, performance-counted, or test-covered, et cetera) to have extra logic to decode specific patterns into one-hot signals, rendering a performance counter in which it is implemented more general purpose.

As previously mentioned, prior art performance counter designs were not general purpose, in that they have limited range and are designed solely for performance calculations and debug of a system design. The embodiments described herein are general purpose, in that the AND/OR circuit can perform calculations on the entire range of the data collection bus 104. The embodiments also incorporate the concept of coverage. In particular, by observing specific states in a logic design, the designer can determine how much of the state space thereof is being covered by the test vectors of a test suite. The designer can thereby gauge whether more tests need to be run and what needs to be added to fully test the entire design.

An implementation of the invention described herein thus provides a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown are implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A match circuit for implementation in a general purpose performance counter ("GPPC") connected to a bus carrying debug data, the match circuit comprising logic for activating a match signal when a selected N-bit portion of the debug data matches an N-bit threshold for all bits selected by an N-bit match mask ("mmask").

2. The match circuit of claim 1 wherein N is equal to sixteen.

3. The match circuit of claim 1 wherein the N-bit threshold is provided from a control status register ("CSR").

4. The match circuit of claim 1 wherein the N-bit mmask is provided from a control status register ("CSR").

5. The match circuit of claim 1 wherein the debug data comprises 80 bits.

6. The match circuit of claim 5 wherein the debug data comprises eight 16-bit portions aligned on 10-bit blocks.

7. The match circuit of claim 6 wherein the selected portion comprises one of the eight 16-bit portions.

8. The match circuit of claim 1 wherein the logic for activating a match signal comprises logic for comparing a binary bit of the selected debug data portion with a corresponding bit of the threshold and outputting a binary bit indicative of whether the compared bits match.

9. Circuitry for implementation in a general purpose performance counter ("GPPC") connected to a bus carrying debug data, the circuitry for analyzing a selected portion of the debug data, comprising:

logic means for activating a match signal when the selected portion of the debug data includes a specified bit pattern;

logic means for activating a threshold signal based on a comparison between at least a subset of the selected debug data portion and a threshold value; and logic means for outputting one of the match signal and the threshold signal in response to a selection control signal.

10. The circuitry of claim 9 wherein the logic means for activating a match signal further comprises:

an exclusive NOR ("XNOR") circuit operating to perform a bit-wise XNOR operation between the selected debug data portion and a threshold register that is as wide as the selected debug data portion;

an OR circuit for ORing an inverted mask ("mmask") with the output of the XNOR circuit; and an AND circuit operating to AND the OR circuit's output to generate the match signal.

11. The circuitry of claim 10 wherein the mmask is provided from a control status register ("CSR").

12. The circuitry of claim 10 wherein the threshold register is provided as a control status register ("CSR").

13. The circuitry of claim 10 wherein the debug data comprises 80 bits.

14. The circuitry of claim 10 wherein the debug data comprises eight 16-bit portions aligned on 10-bit blocks.

15. The circuitry of claim 14 wherein the selected portion comprises one of the eight 16-bit portions.

16. The circuitry of claim 9 wherein the logic means for activating a threshold signal comprises a compare circuit that outputs a logic one when the subset of the selected debug data portion is greater than or equal to the threshold value.

17. The circuitry of claim 9 wherein the logic means for outputting one of the match signal and the threshold signal comprises a 2:1 multiplexer circuit.

18. A method operable in a general purpose performance counter ("GPPC") connected to a bus carrying debug data for of analyzing a selected portion of the debug data, the method comprising:

activating a match signal when the selected portion of the debug data includes a specified bit pattern;

activating a threshold signal based on a comparison between at least a subset of the selected debug data portion and a threshold value; and outputting one of the match signal and the threshold signal in response to a selection control signal.

19. The method of claim 18 wherein the activating of a match signal comprises:
performing a bit-wise exclusive NOR operation between the selected debug data portion and a threshold register that is as wide as the selected debug data portion to create a first intermediary output;
performing an OR operation between the first intermediary output and an inverted mask ("mmask") to create a second intermediary output; and
performing an AND operation on the second intermediary output to generate the match signal.

20. The method of claim 19 wherein the mmask is provided from a control status register ("CSR").

21. The method of claim 19 wherein the threshold value is provided from a control status register ("CSR") operating as the threshold register.

22. The method of claim 19 wherein the selected portion of the debug data comprises 16 bits.

23. The method of claim 19 wherein the debug data comprises eight 16-bit portions aligned on 10-bit blocks.

24. The method of claim 23 wherein the selected portion comprises one of the eight 16-bit portions.

25. The method of claim 18 wherein the activating of a threshold signal comprises outputting a logic one when the subset of the selected debug data portion is greater than or equal to the threshold value.

\* \* \* \* \*

UNITED STATES PATENT AND TRADEMARK OFFICE
CERTIFICATE OF CORRECTION

PATENT NO. : 7,331,003 B2
APPLICATION NO. : 10/635373
DATED : February 12, 2008
INVENTOR(S) : Richard W. Adkisson et al.

It is certified that error appears in the above-identified patent and that said Letters Patent is hereby corrected as shown below:

On the title page, in field (73), under "Assignee", in column 1, line 2, after "L.P." insert -- , Houston, TX (US) --.

In column 8, line 61, in Claim 18, after "for" delete "of".

Signed and Sealed this

Tenth Day of June, 2008

JON W. DUDAS
*Director of the United States Patent and Trademark Office*